United States Patent [19]
de Boer

[11] B 3,990,610
[45] Nov. 9, 1976

[54] INSTALLATION FOR FEEDING A CURD/WHEY MIXTURE IN THE CORRECT RATIO TO A CHEESE STUFFING MACHINE

[75] Inventor: Geert de Boer, Lippenhuizen, Netherlands

[73] Assignee: Stork Amsterdam B.V., Amstelveen, Netherlands

[22] Filed: July 10, 1974

[21] Appl. No.: 487,260

[44] Published under the second Trial Voluntary Protest Program on January 27, 1976 as document No. B 487,260.

[30] Foreign Application Priority Data
July 18, 1973 Italy .................................. 10020/73

[52] U.S. Cl. .............................. 222/136; 222/192
[51] Int. Cl.² ............................................ B67D 5/52
[58] Field of Search ............ 222/134, 136, 145, 192

[56] References Cited
UNITED STATES PATENTS
| | | | |
|---|---|---|---|
| 1,327,990 | 1/1920 | French | 222/136 |
| 2,065,128 | 12/1936 | Eisinger | 222/136 X |
| 2,758,566 | 8/1956 | Talbott | 222/136 X |

*Primary Examiner*—Allen N. Knowles
*Assistant Examiner*—Hadd Lane
*Attorney, Agent, or Firm*—Edmund M. Jaskiewicz

[57] ABSTRACT

A method and an installation for stuffing cheese, in which one feeds a whey/curd mixture through a volumetric pump to the stuffing machine, an additional whey supply being connected to the suction side of said pump via an adjustable valve.

1 Claim, 2 Drawing Figures

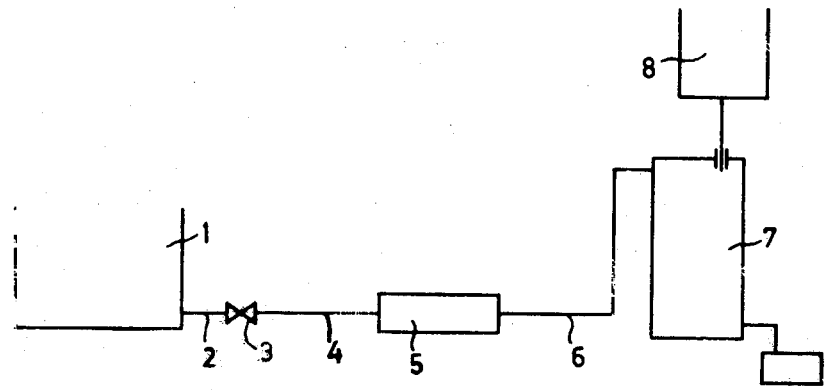
_Fig: 1._
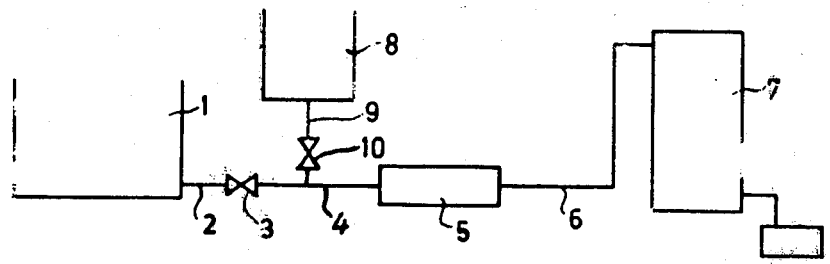
_Fig: 2._

INSTALLATION FOR FEEDING A CURD/WHEY MIXTURE IN THE CORRECT RATIO TO A CHEESE STUFFING MACHINE

BACKGROUND OF THE INVENTION

My invention relates to a method for feeding a whey/curd mixture in the correct ratio to a cheese stuffing machine, according to which one pumps a quantity of curd with whey from a collecting reservoir and pours it into said machine while simultaneously supplying a suitable quantity of whey from a reservoir. With such a method the most important problem is keeping the whey/curd ratio constant. So far one has always fed for this purpose an additional amount of whey continuously to the cheese stuffing machine.

This known method, however, presents some drawbacks, to wit in the first place that inevitably a quantity of air is carried along and gets into the whey/curd mixture. Furthermore regulating or dosing the required amount of whey is rather difficult. Also the distribution of the additionally supplied whey to the separately supplied amount of the curd/whey mixture causes difficulties. When carrying out this known method it is found that it is not possible to realize a constant mass flow in the cheese stuffing machine.

SUMMARY OF THE INVENTION

My invention aims at providing a method in which the afore-stated drawbacks are eliminated completely or for the greater part. This object is accomplished in that one sucks with the pump not only the quantity of curd/whey mixture but also draws an adjustable amount of whey from the reservoir subsequently passing the aggregate mixture of whey/curd to the cheese stuffing machine.

As a result of these measures it is possible to arrange at the suction side of the pump a reservoir with conduit and valve which directly admits the whey to the suction line of said pump. In this manner it is easy to control the dosing and the carrying along of air is excluded. At the pressure side of the pump a constant mass flow is produced since the pump belongs to the so-called volumetric type.

My invention furthermore relates to an installation for performing the afore-mentioned method, said installation comprising a cheese stuffing machine, a collecting reservoir for curd with whey, a reservoir for whey and a volumetric pump with a suction pipe and a pressure pipe, the collecting reservoir being connected to the pump suction pipe and the pressure pipe opening into the cheese stuffing machine. According to my invention said installation distinguishes itself in that in addition to the collecting reservoir for curd with whey also the whey container is connected via an adjustable valve to the suction pipe of the pump.

In this installation the usual open supply of whey is replaced by a closed system which prevents air from being carried along and prevents the attracting of bacteria. Also the mixing and the distribution of the amount of curd/whey with the additionally supplied whey is better than in the usual installations thanks to the pump action. The most important advantage — which especially is perceptible in the final product to be arrived at — consists in that with the installation according to my invention always a constant mass flow is fed to the cheese stuffing machine.

SURVEY OF THE DRAWINGS

FIG. 1 shows the prior art arrangement used so far.

FIG. 2 shows diagrammatically the arrangement according to my invention.

DESCRIPTION OF A PREFERRED EMBODIMENT

In the installation used so far for compacting curd in a so-called cheese stuffing machine one uses the arrangement according to FIG. 1. In a collecting reservoir 1 a quantity of curd with whey is stored, said container 1 (which is also called cheese container or buffer container) being connected via a connecting line 2 with a valve 3 to the suction line 4 of a volumetric pump 5. The pressure pipe 6 of the pump 5 opens into a cheese stuffing machine 7 which may be designed in accordance with the Netherlands Pat. Nos. 107.563 and 121.219. Finally there is provided a reservoir 8 for whey with the aid of which some whey is constantly fed to the machine 7 in order to keep the whey/curd ratio constant.

FIG. 2 shows the installation according to the invention which mainly corresponds with the arrangement according to FIG. 1 with the important difference that the location c.q. the connection of the reservoir 8 is modified. This modification consists in the application of a conduit 9 with a valve 10 with which the whey reservoir 8 is connected to the suction pipe 4 of the pump 5.

It will be obvious that by displacing the additional supply of whey from a point beyond the pump 5 to a point situated upstreams of said pump one may realize a more homogeneous supply of the whey/curd mixture to the cheese stuffing machine 7, and also the regulation of the ratio between whey and curd is simplified. A constant mass flow is produced in the conduit 7 to the machine 7 which enhances the quality of the final product as compared with the method followed so far.

What I claim is:

1. An installation for proportioning and mixing whey and curd and passing the resultant mixture to a cheese stuffing machine, said installation comprising a cheese stuffing machine, a collecting reservoir for curd and whey, a second reservoir for whey only, a volumetric pump with a suction pipe and a pressure pipe, said collecting reservoir being connected to the pump suction pipe, and a conduit connecting said second reservoir for whey to the suction pipe of said pump, and a valve in said conduit for controlling the flow of whey therethrough, the pressure pipe of said pump being connected to said cheese stuffing machine for the passage of the mixture of whey and curd thereto.

* * * * *